July 4, 1967 C. H. MOSEBACH 3,329,193
PNEUMATIC TIRE CONSTRUCTION
Filed July 27, 1965

INVENTOR:
CARL H. MOSEBACH
BY Howson & Howson
ATTYS.

United States Patent Office 3,329,193
Patented July 4, 1967

3,329,193
PNEUMATIC TIRE CONSTRUCTION
Carl H. Mosebach, 2066 New Holland Pike, P.O. Box 831,
Lancaster, Pa. 17601
Filed July 27, 1965, Ser. No. 475,073
8 Claims. (Cl. 152—340)

ABSTRACT OF THE DISCLOSURE

This patent discloses a pneumatic tire having a separate tread structure mounted on the tire body and anchored in place thereon by inflation of the tire body. The tread structure has a concavity into which the tire body projects upon inflation, and the tire body may be provided with either a single chamber or a double chamber, the second chamber surrounding the first chamber and being capable of separate deflation to permit removal of the tread structure when the outer chamber is deflated. The tread structure is mounted in spaced relation to the body structure by space elements which afford transverse air flow between the tread and the body around the spacer elements therebetween. The inflation of the tire body firmly engages the tread structure on the body through the spacer elements and effectively stabilizes the periphery of the tire.

---

The present invention relates to pneumatic tire construction, and has particular application to tires for use on land vehicles adapted to travel at high speeds.

A primary object of failure of pneumatic tires is the build-up of excess pressure in the temperature of the tire due to its traveling at high speeds. When traveling at high speeds, there is considerable friction between the road surface and the tread on the outer periphery of the tire, and this friction is transmitted through the tire to the pneumatic chamber therein, which raises the temperature of the air in the chamber with the resulting increase in pressure within the chamber. When the pressure becomes excessive, a blow-out or other failure may occur.

The present invention reduces the probability of blow-outs by providing an insulating barrier intermediate the road-engaging tread surface of the tire and the pneumatic chamber.

More specifically, the present invention provides an air space intermediate the road-engaging surface of the tire and the pneumatic chamber thereof, through which space atmospheric air may flow to reduce the heat transfer from the road-engaging tread to the pneumatic chamber.

The invention also provides for replacement of the tread surface of the tire while retaining the body portion which houses the pneumatic chamber thereof.

All of the objects of the invention are more fully set forth hereinafter with reference to the accompanying drawing, wherein.

Figure 1:
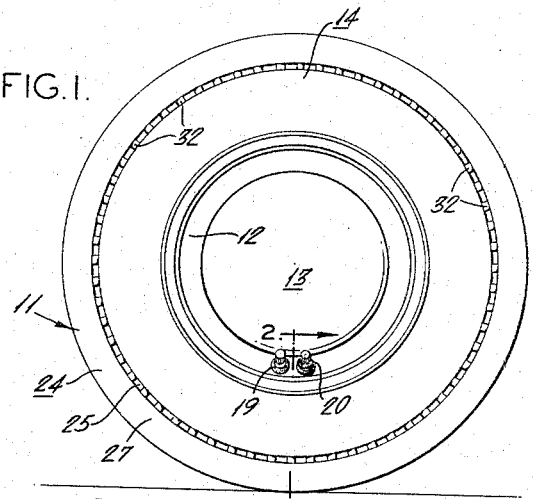
FIG. 1 is a view in side elevation of a tire made in accordance with the present invention mounted on a wheel.
Figure 2:
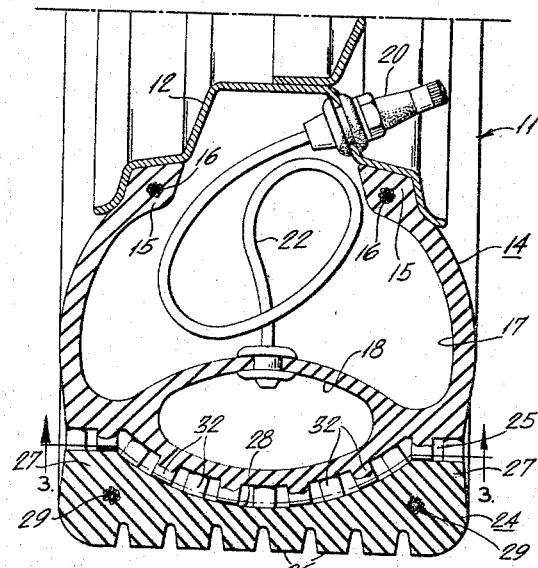
FIG. 2 is a fragmentary sectional view at an enlarged scale taken on the line 2—2 of FIG. 1.
Figure 3:
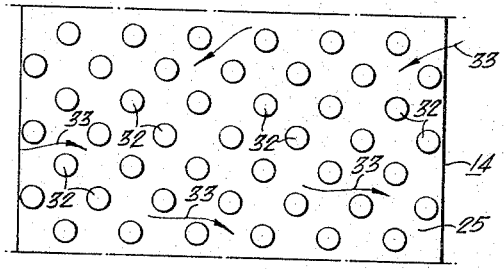
FIG. 3 is a sectional view taken on the irregular line 3—3 of FIG. 2.

Referring now to the drawing, the tire 11 illustrated in FIGS. 1 to 3 inclusive is shown mounted on a wheel 12 which may be of conventional design and having a hubcap 13 thereon. The tire 11 comprises an annular body structure 14 having inwardly-projecting internal peripheral lips 15 for engaging the rim of the wheel 12. As shown, the lips are reinforced by reinforcing elements 16, in the present instance stranded cable or the like. In the present instance, the body structure 14 comprises a double pneumatic chamber having a main portion 17 and an auxiliary portion 18 centrally between the side walls of the body structure 14 adjacent its outer periphery. The main and auxiliary chambers 17 and 18 respectively are independently inflated, for example by valves 19 and 20 mounted in the rim of the wheel 12. As shown in FIG. 2, the valve 20 is connected to the chamber 18 through a flexible conduit 22 leading from the valve 20 to the chamber 18. The valve 19, on the other hand, opens directly into the chamber 17 so as to control the inflation of the main chamber. The lips 15 of the body portion 14 are in sealing engagement with the rim so as to preclude the escape of air between the lips 15 and the rim.

In accordance with the invention, the tire 11 comprises a separate tread structure 24 circumscribing the body structure 14 in spaced relation thereto, providing an air passage 25 between the tread structure and the body structure. To this end, the tread structure consists of an annular member having a tread 26 on its outer peripheral road-engaging surface and having shoulders 27 projecting inwardly toward the body portion with a concavity 28 therebetween. Flexible non-extensible reinforcing bands 29 are positioned in the shoulders 27 to anchor the tread structure 24 on the body portion. To afford the spacing between the body structure 14 and the tread structure 24 which forms the passageway 25, spacer elements, in the present instance in the form of cylindrical studs 32, are integrally formed on the outer periphery of the body structure, the outer terminal end portions of the studs forming a distended portion having an outline conforming to the contour of and registering with the inner periphery of the tread portion so as to securely engage thereon.

In the present instance, the auxiliary chamber 18 is in the form of an annulus having an elliptical cross section with the outer distended wall of the chamber being arcuate to conform to the concavity 28. Upon inflation of the auxiliary chamber 18, the pressure of the air therein forces the studs 32 to project into firm engagement with the concave portion of the inner periphery of the thread structure so as to firmly anchor the tread structure against lateral displacement on the body structure 14. In like manner, inflation of the main chamber 17 expands the body structure adjacent the inner and outer sides of the tire to engage the studs against the shoulders 27. Thus, when both chambers 17 and 18 of the tire are properly inflated, the tread structure 24 is firmly anchored upon the body structure 14 in spaced relation thereto, the spaces between the studs affording transverse air flow through the passage 15 as indicated by the arrows 33 in FIG. 3. This transverse air flow through the space 25 assists in the dissipation of heat from the tread structure 24 and limits the transfer of heat from the tread structure 24 to the body structure 14. In this manner, the pneumatic chambers 17 and 18 in the body portion are not subjected to the amount of heat and consequent pressure rise that is considered inherent in a conventional pneumatic tire structure.

The use of the double chamber within the body portion of the tire insures firm engagement of the tread structure within the concavity 28 regardless of the loss of pressure within the main chamber 17. When it is desired to disengage the tread structure 24, for example, due to damage to the structure or excessive wear thereof, it is necessary to collapse the chamber 18, for example by applying suction thereto and to reduce the pressure in the main chamber 17 to at least partially deflate the same so as to afford disengagement of the studs 32 from the inner peripheral wall of the tread structure. With the chamber 18 collapsed and the chamber 17 deflated, the tread structure 24 may be laterally displaced from circumscribing relation with the body structure 14 and a fresh tread structure may be mounted thereon whereupon the chambers 17 and 18 are again expanded to their full pressure to anchor the new tread structure on the body structure.

Figure 4:
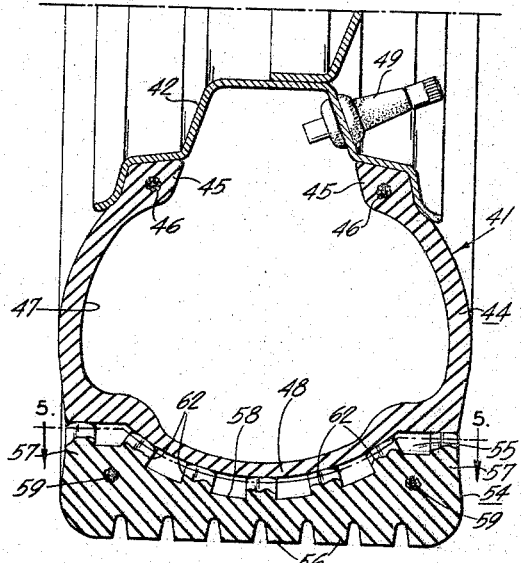
FIG. 4 is a view similar to FIG. 2 showing a modified embodiment of tire made in accordance with the present invention.
Figure 5:
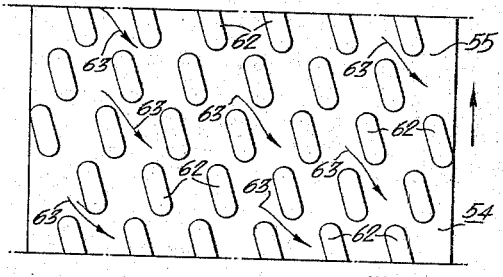
FIG. 5 is a sectional view taken on the irregular line 5—5 of FIG. 4.

In the modified embodiment of the invention illustrated in FIGS. 4 and 5, the modified tire 41 is mounted on a wheel rim 42 having a single valve 49 therein. The tire 41 comprises a body structure 44 having rim-engaging lips 45 with reinforcements 46 therein. The body structure has a single chamber 47, the inflation of which is controlled by the valve 49. A tread structure 54 is mounted on the outer periphery of the body structure 44 in spaced relation thereto to provide a passageway 55 therebetween. The outer periphery of the tread structure 54 is provided with a tread formation 56 for engaging the road surface and is provided with inwardly projecting shoulders 57 defining therebetween a concavity 58. Flexible non-extensible reinforcing elements are provided at 59. To maintain the tread structure 54 in spaced relation to the body structure 44, so as to provide the passageway 55, spacer elements 62 are provided. In the present instance, the elements 62 comprise cleats integrally formed on the tread structure 54 to project inwardly into engagement with the outer periphery of the body structure 44. As shown, the body structure 44 has centrally thereof a distended portion 48 conforming generally to the contour of the concavity 58 and adapted to bear against the cleats 62 thereon.

As in the previously described embodiments, the spacer cleats 62 maintain the tread structure 54 in spaced relation to the body structure 44 so as to afford air flow through the space 55 as indicated by the arrows 63 in FIG. 5. It is noted that the cleats 62 are disposed at an acute angle to the circumferential center-line of the tire so as to assist the flow of air transversely through the passageway 55, as indicated by the arrows 63. If desired, the cleats may be formed in an airfoil or other cross-section to further increase the transverse air flow through the passage. The air flow through the clearance passageway 55 provides for dissipation of the heat from the tread structure 54 and reduces the transfer of heat from the tread area 56 to the pneumatic chamber 47 of the body structure, thereby reducing the possibility of failure of the tire due to excess pressure build-up in the pneumatic chamber 47 that would otherwise occur due to its elevation in temperature.

The pressure in the chamber 47 maintains the outer periphery of the body structure in firm engagement with the tread portion 64 by means of the spacers 62. When it is desired to remove the tread structure 54 from the body portion, as for example when the tread structure is damaged or excessively worn, it is only necessary to deflate the chamber 47 sufficiently to enable the distended portion 48 to be displaced inwardly so as to afford lateral displacement of the tread structure from the body structure of the tire and replacement thereof by a new or repaired tread structure.

While particular embodiments of the present invention have been herein illustrated and described, it is apparent that other changes or modifications may be made in the construction and arrangement of the tire to satisfy the requirements for a particular end use, so long as the tread structure of the tire is mounted on the body structure in spaced relation thereto so as to provide a passageway for atmospheric air therebetween, in accordance with the invention as defined in the following claims.

I claim:

1. A pneumatic tire construction comprising a body structure adapted to be mounted on a wheel and having at least one pneumatic chamber therein, a separate tread structure circumscribing said body structure in spaced relation thereto to provide a free air passage in the clearance space therebetween, spacer elements formed integral with one of said structures and operable upon inflation of said pneumatic chamber to firmly engage the other of said structures, said spacer elements being disposed intermediate said structures throughout said clearance space and operable to afford atmospheric air flow in said passage therebetween, said passage retarding heat transfer from said tread structure to said body structure.

2. A tire construction according to claim 1 wherein said spacer elements comprise a plurality of spaced-apart cylindrical studs mounted on said body structure and projecting outwardly into engagement with said tread structure.

3. A tire construction according to claim 1 wherein said spacer elements comprise spaced-apart cleats integral with said tread structure and projecting inwardly into engagement with said body structure.

4. A tire construction according to claim 1 wherein said spacer elements comprise elongated, spaced-apart cleats disposed at an acute angle to the circumferential centerline of the tire, so as to assist the air flow laterally through the passage intermediate said body and tread structures.

5. A tire construction according to claim 1 wherein said tread structure comprises inwardly-directed shoulders defining therebetween a concavity, and wherein further said body structure has a distended portion on its outer periphery conforming to and in registry with said concavity operable upon inflation of said pneumatic chamber to anchor said tread structure against lateral displacement on said body structure.

6. A tire construction according to claim 5 wherein said tread structure includes non-extensible flexible reinforcing bands within said shoulders.

7. A pneumatic tire construction comprising a body structure adapted to be mounted on a wheel and having at least two pneumatic chambers therein, a separate tread structure circumscribing said body structure and comprising inwardly-directed shoulders defining therebetween a concavity, and spacer elements formed integral with one of said structures and operable upon inflation of said pneumatic chambers to firmly engage the other of said structures, said spacer elements being disposed intermediate said structures throughout said concavity, one of said chambers comprising an auxiliary chamber in the form of an annulus centrally intermediate the side walls of said body structure and adjacent the outer periphery thereof, the outer wall of said auxiliary chamber including a distended portion on the outer periphery of said body portion conforming to and in registry with said concavity and operable upon inflation of said pneumatic tire and engagement of said spacer elements to anchor said tread structure against displacement on said body structure.

8. A tire construction according to claim 7 wherein the auxiliary chamber is generally oval in cross-section and including separate means controlling the inflation of said auxiliary chamber whereby said auxiliary chamber may be collapsed independently of the other pneumatic chamber to thereby retract the distended wall portion thereof to afford lateral displacement of said tread structure from said body structure.

References Cited

UNITED STATES PATENTS

| | | | |
|---|---|---|---|
| 2,226,453 | 12/1940 | Vretman | 152—339 |
| 2,955,636 | 10/1960 | Gray | 152—340 |
| 3,110,339 | 11/1963 | Fickel | 152—339 |
| 3,143,155 | 8/1964 | Knox | 152—330 |
| 3,183,956 | 5/1965 | Jenkins | 152—191 |

ARTHUR L. LA POINT, *Primary Examiner.*

C. W. HAEFELE, *Assistant Examiner.*